United States Patent [19]

Henecke

[11] 3,938,395

[45] Feb. 17, 1976

[54] BICYCLE SPEEDOMETER TIRE DRIVE GEAR ADAPTOR ASSEMBLY

[75] Inventor: Charles F. Henecke, Oak Park, Ill.

[73] Assignee: Stewart-Warner Corporation, Chicago, Ill.

[22] Filed: Jan. 31, 1974

[21] Appl. No.: 438,225

[52] U.S. Cl.................. 74/12; 74/501 R; 235/95 R
[51] Int. Cl.²......................................... F16H 37/00
[58] Field of Search............ 74/501 R, 12, 13, 416; 64/2 R–5 R; 235/95 R, 121

[56] References Cited
UNITED STATES PATENTS

| | | | |
|---|---|---|---|
| 1,441,473 | 1/1923 | Ames | 74/12 |
| 3,643,860 | 2/1972 | Murphy et al. | 235/95 R |

*Primary Examiner*—Samuel Scott
*Assistant Examiner*—Frank H. McKenzie, Jr.

[57] ABSTRACT

A bicycle speedometer tire drive gear adaptor assembly comprising a pair of helical gears engaging at an angle of substantially 120°. The gears are supported in a unitary housing with one of the gears rotated by a friction wheel engaging the bicycle tire and the other, which utilizes its own teeth as a bearing, rotates at a substantially reduced speed to transmit movement through a flexible shaft to the speedometer. The angle of gear engagement aids in eliminating sharp corners or small radii in the flexible shaft. The housing is secured to the front bicycle fork by oppositely directed arcuate spring clip fingers having reverse bent ends nesting in and conforming to the shape of a pair of longitudinal grooves in the housing to securely hold the housing.

6 Claims, 7 Drawing Figures

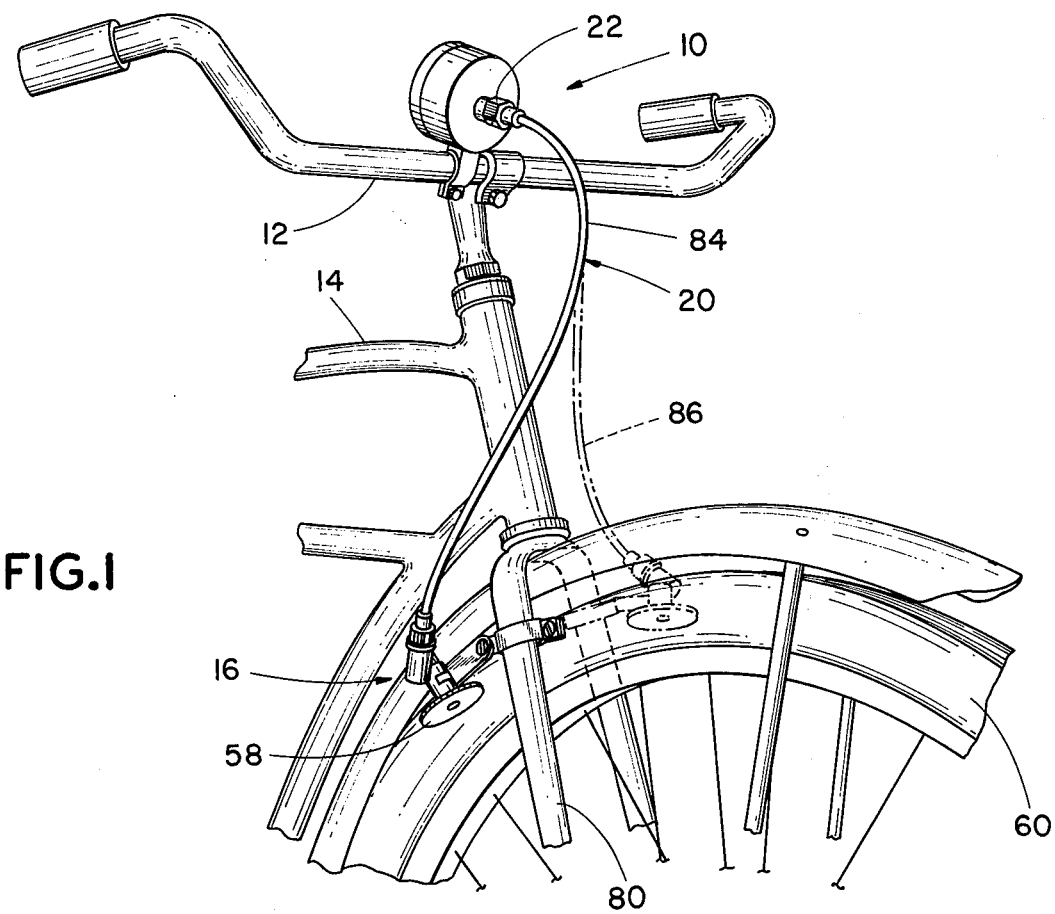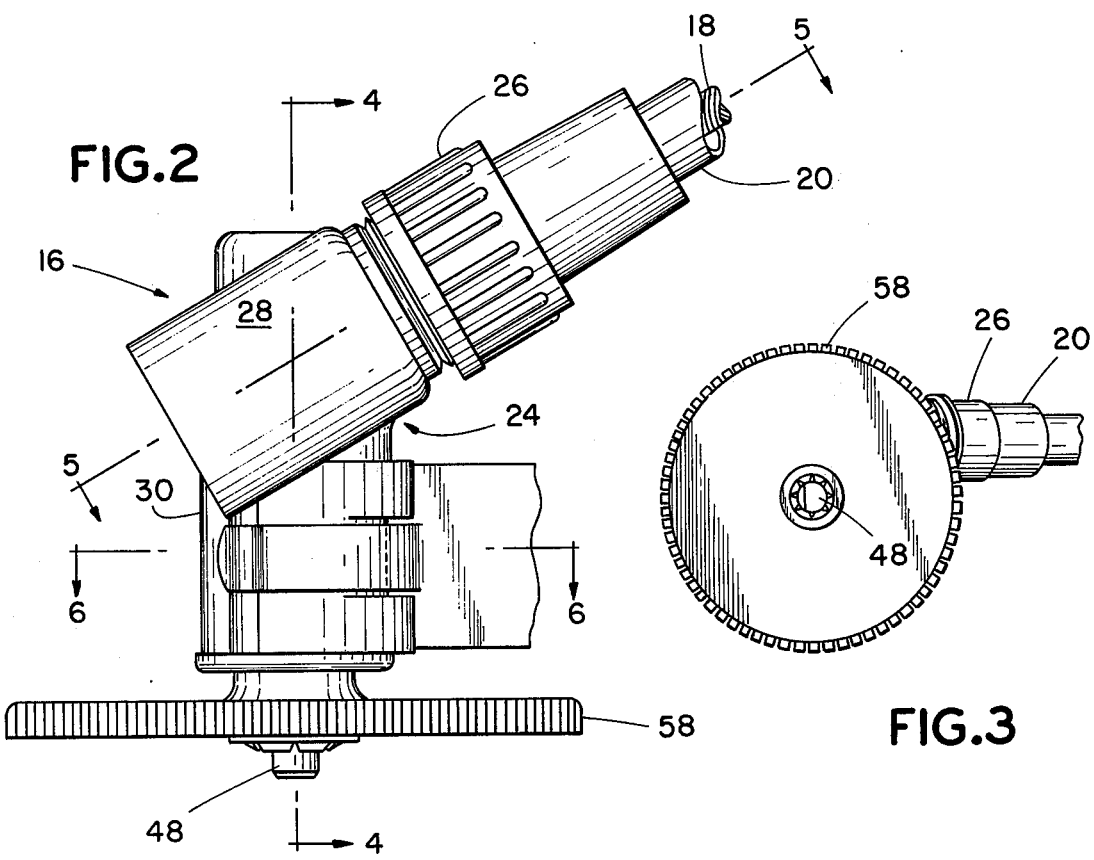

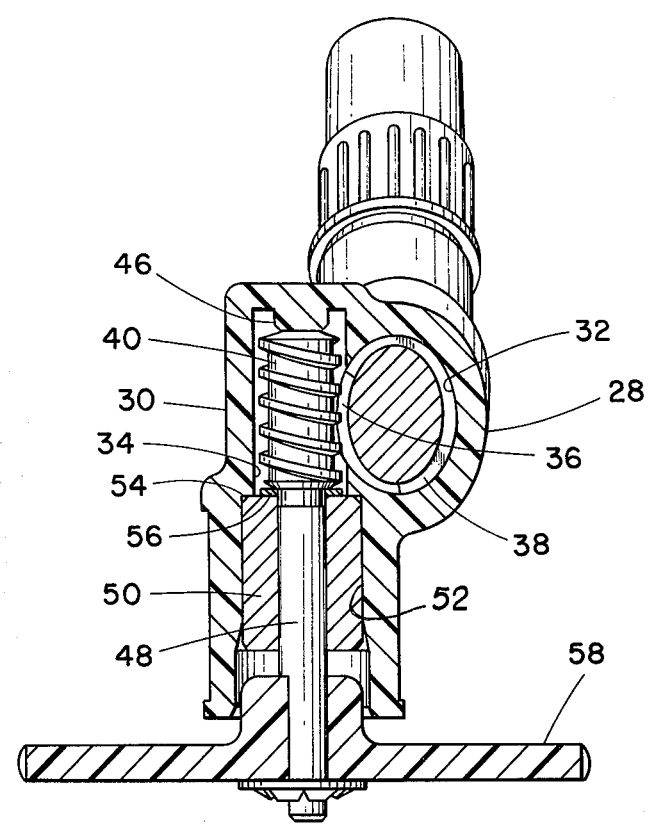
FIG.4
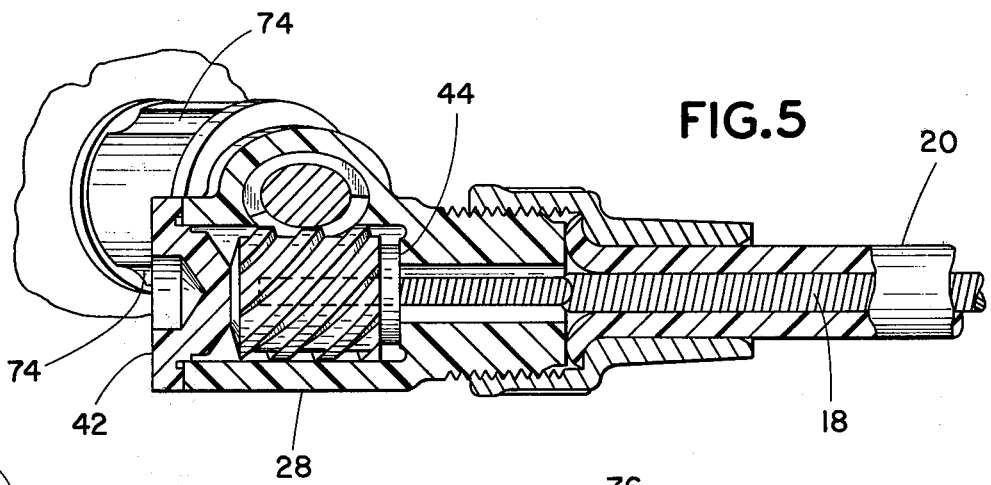
FIG.5
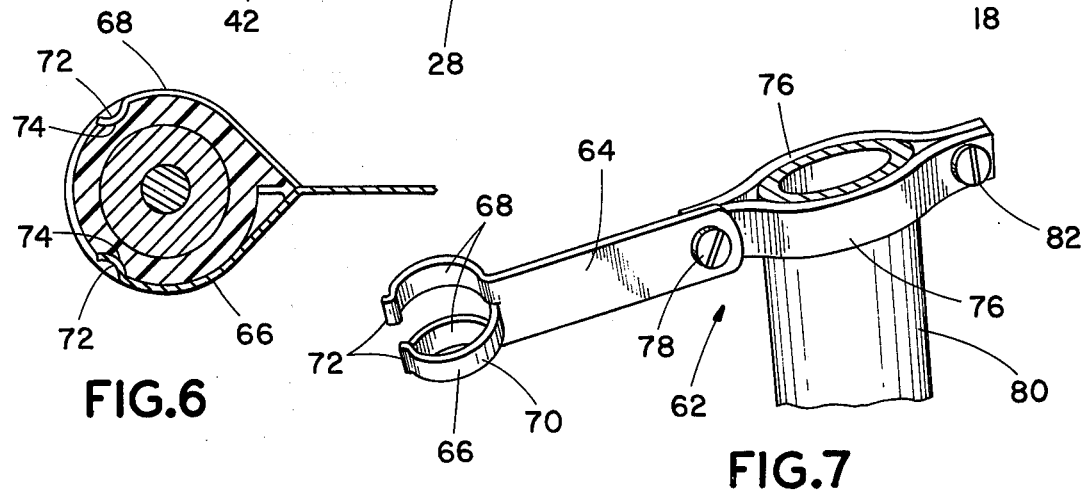
FIG.6
FIG.7

3,938,395

BICYCLE SPEEDOMETER TIRE DRIVE GEAR ADAPTOR ASSEMBLY

BACKGROUND OF THE INVENTION

1. Field of the Invention

This invention relates in general to bicycle speedometer tire drive gear adaptor assemblies and more particularly to an improved and economical bicycle speedometer tire drive gear adaptor assembly.

2. Brief Summary of the Prior Art

Bicycle speedometer drive assemblies are usually mounted on one of the bicycle wheel axles to transmit movement of the wheel adjacent the axle to the speedometer. This arrangement, however, does not provide accurate speed indications since actual bicycle speed depends on the wheel diameter.

Providing an axle mounted speedometer drive for accurately indicating bicycle speed requires a gear adaptor assembly individual to respective wheel diameters, and this is expensive. Employing a tire drive gear adaptor to operate the speedometer from one of the bicycle wheel tires does provide accurate speed indication, but requires substantial gear reduction due to the high tire velocity. The large number of gears and bearings necessary for substantial gear reduction also results in an expensive drive.

Additionally, tire drive gear adaptor assemblies are mounted on the bicycle fork for facile engagement with the front tire. In this position, there is a relatively short distance between the gear adaptor assembly and the speedometer, which is mounted on the handlebars at the front of the bicycle. Due to the short distance and the projection of the speedometer boss in a forward direction, the flexible shaft, which transmits movement between the gear adaptor assembly and speedometer, is often difficult to connect without being bent at a sharp angle with a minimum radius.

SUMMARY OF THE INVENTION

The present invention employs a tire drive gear adaptor assembly in which only two tandemly driven helical gears provide sufficient speed reduction to operate the speedometer from the tire. A unitary plastic housing is provided for the two gears with the gear teeth of one of the gears serving as a bearing surface to eliminate the usual gear bearing.

Further, the two helical gears are arranged at an angle of 120° to each other in the housing. This arrangement facilitates the use of a short length of flexible shaft with a large radius of curvature between the gear adaptor assembly located adjacent the upper portion of the front bicycle tire and the speedometer mounted on the bicycle handlebars.

The housing is secured to the bicycle fork by a bracket assembly comprising a simple spring clamp cooperating with a recess in the housing wall to properly orient and hold the housing to thereby provide further economies.

It is, therefore, a primary object of the present invention to provide an improved and more economical bicycle speedometer tire drive gear adaptor assembly.

Other objects and features of the present invention will become apparent on examination of the following specification and claims together with the drawings.

BRIEF DESCRIPTION OF THE DRAWINGS

FIG. 1 is a general isometric view of a front portion of a bicycle on which is mounted a speedometer, flexible shaft assembly and a tire drive gear adaptor assembly, employing the principles of the present invention;

FIG. 2 is a side elevational view of the gear adaptor assembly together with a portion of the flexible shaft assembly;

FIG. 3 is a bottom elevational view of the assembly shown in FIG. 2.

FIG. 4 is a sectional view taken along the line 4—4 in FIG. 2;

FIG. 5 is a sectional view taken along the line 5—5 in FIG. 2;

FIG. 6 is a sectional view taken along the line 6—6 in FIG. 2; and

FIG. 7 is an isometric view of the bracket assembly and a relevant portion of the bicycle fork.

DESCRIPTION OF THE PREFERRED EMBODIMENT

In FIG. 1 a bicycle speedometer is indicated by the reference character 10. The speedometer 10 is mounted on handlebars 12 of a bicycle 14 and includes a conventional mechanism operated by a gear adaptor assembly 16. The assembly 16 is connected to the speedometer 10 by a flexible shaft assembly, which includes a flexible shaft 18 as seen in FIGS. 2 and 5. Shaft 18 is carried in a flexible shaft casing 20. The casing 20 is secured at one end of the speedometer boss 22 and the shaft 18 extends into the boss for transmitting movement to the speedometer mechanism. The boss 22 extends in a forwardly direction or in the direction of bicycle movement so that the shaft 18 and casing 20 must adopt a path extending generally along the axis of boss 22.

The gear adaptor assembly 16 includes a nylon housing 24 having two integrally formed intersecting tubular sections 28 and 30. Section 28 has a threaded end for receiving a nut 26 to attach one end of the flexible shaft casing 20 and the associated ferrule thereto. The sections 28 and 30 have an outer diameter of substantially ½ inch and define passageways 32 and 34, respectively, whose axes extend at substantially 120° to each other. Section 28 is approximately 1¼ inches long and section 30 is approximately 1½ inches long, and their elongate axes are offset from each other by a distance providing intersection of the periphery of the passageway 32 with the periphery of section 34. The intersecting passageways 32 and 34 are in communication through a passageway 36 formed in the intersecting portion of the walls of sections 28 and 30. The axis of passageway 36 is located substantially 0.88 inch from the ferrule end of section 28 and approximately 1 inch from one end of section 30. Passageway 32 rotatably supports a helical gear 38 and passageway 34 receives a helical gear 40 with the two helical gears in engagement through the passageway 36.

Helical gear 38, in addition to being rotatably supported by the interior wall of passageway 32, has a noncircular central opening. The opening in gear 38 receives the correspondingly shaped end of flexible shaft 18 for rotating shaft 18 to operate the speedometer 10. A plastic cap 32 ultrasonically welded to one end of section 28 closes the passageway and holds gear 38 against axial movement in one direction. A shoulder 44 holds the gear 38 against axial movement in the opposite direction. Gear 38 is provided with substantially ten left hand helical teeth formed at an angle of substantially 43° 14' and a pitch of 44, which is relatively easily manufactured. The teeth have an outside cylindrical diameter of substantially 0.43 inch and extend for substantially 0.5 inch along the surface of passageway 32 and, due to the large pitch, provide a bearing surface.

Gear 40 is provided with only two left hand helical teeth formed with a pitch of 44 at a helix angle of 76° 46' so that the total angle between the teeth add to 120° for proper engagement at the selected angle. Gear 40 is engaged at one end by a projection 46 on an end wall of section 30 to restrain the gear 46 against axial movement in one direction. A reduced diameter shaft 48 extends from the other end of gear 40 through a bearing 50. Bearing 50 is press fit in an enlarged diameter portion 52 of passageway 34 to define a shoulder 54. Shoulder 54 engages one end of bearing 50 for limiting bearing movement in one axial direction. In addition, a thrust bearing ring 56 fits in a groove in shaft 48 between gear 40 and bearing 50. Shaft 48, at the end opposite gear 40, extends beyond section 30 to a friction wheel 58 fixed thereto.

Wheel 58 has a diameter of substantially 1.9 inches and extends beyond the periphery of housing sections 28 and 30. A serrated periphery is provided on wheel 58 for engaging the side wall of the bicycle tire 60. The wheel 58 is held in engagement with tire 60 by means of a bracket assembly 62, seen in FIGS. 1, 6 and 7.

The bracket assembly 62 comprises an elongate member 64 having an integrally formed spring clip 66 at one end. The spring clip comprises two axially spaced semi-circular leg 70 spaced axially intermediate the two legs 68 and extending in a direction opposite legs 68.

Each leg 68 and 70 has an end formed in a reverse bend 72 to a shape corresponding to the shape of a respective longitudinal groove 74 formed in the periphery of section 30. The legs 66 and 68 are expanded to pass over the periphery of section 30 and then released to seat the bends 72 in the grooves 74. The legs 66 and 68 tightly grip section 30 and hold the sections 28 and 30 against pivotal or longitudinal movement relative member 64. It will be noted that the bends 72 bear against the side walls of the respective grooves 74 so that any relative pivotal movement is transverse to the groove walls and prevented thereby. The end of member 64 opposite legs 66 and 68 is secured to a pair of straps 76 by means of a threaded fastener 78.

The straps 76 each have a convex formation intermediate their ends conforming to the periphery of the bicycle fork leg 80 and are fastened together at opposite ends by means of fastener 78 and a fastener 82 to tightly grip the fork leg therebetween. It will be noted that the straps 76 may be adjusted relative the fork and the angular position of member 64 also adjusted to bring the wheel 68 into engagement with the tire wall 60, whereafter the fasteners are tightened to hold the wheel 58 engaged with the tire.

With the described bracket assembly 62, the adaptor assembly 16 is suspended cantilever-fashion from the fork leg 80, as shown by full lines or from the opposite fork leg as shown by the broken lines in FIG. 1. As shown by the full line, the wheel 58 engages the tire wall 60 to the rear of the fork. With the 120° angle between the sections 28 and 30, the flexible shaft 18 and casing 20 project upwardly and forwardly in the direction of the speedometer boss, permitting a reverse bend or curve 84 of large radius in the casing and shaft to facilely align the same with the speedometer boss 22. As shown by the broken line, the adaptor assembly 16 is located forwardly of the bicycle fork and the flexible shaft and casing project upwardly and rearwardly; however, a curve 86 of large radius and curve 84 permit the shaft and casing to be easily aligned with the speedometer boss.

In operation, rotation of the tire 60 serves to rotate the friction wheel 58 at the same speed as the tire irrespective of wheel diameter to in turn rotate gear 40 at the same speed. Gear 40 transmits its movement to gear 36 which rotates at substantially 1/5 the speed of gear 48 with the given ratio of two teeth to ten teeth to rotate the flexible shaft 18 and operate the speedometer at a correspondingly reduced speed. The gear reduction permits operation of the speedometer mechanism at a standard rate of substantially 2000 revolutions per mile and permits the speedometer to accurately reflect the actual bicycle velocity.

Various modifications of the described embodiment are possible without departing from the concepts of the invention which are set forth in the accompanying claims.

What is claimed is:

1. A bicycle speedometer and drive assembly, comprising; a speedometer having a rearwardly projecting boss extending on a first axis, a flexible shaft connected to said speedometer boss, an integrally formed housing having a pair of passageways therein with the axes of said passageways arranged at an obtuse angle to each other and offset from each other, bracket means for connecting said housing to a bicycle fork, a helical gear in each passageway, an opening in said housing communicating said pair of passageways with each other for enabling engagement between said helical gears, each of said gears having teeth, a shaft extending axially from one of said gears, and a tire drive wheel for engaging the side of the tire of said bicycle and fixed to said shaft on said one gear for rotating said gears and flexible shaft in response to rotation of said tire for operating said speedometer, the axes of the drive wheel being substantially perpendicular to the speedometer boss first axis so that the flexible shaft does not have any significant bend, one of said gears being rotatably supported in the housing by engagement between the teeth and the associated passageway, said one gear having an opening therein, said flexible shaft being received in said opening in said one gear.

2. The combination in claim 1 in which said obtuse angle is substantially 120°.

3. The combination defined in claim 2, in which said one gear has at most one-fifth the number of teeth as the other gear to thereby rotate said flexible shaft at a correspondingly reduced speed for operating said speedometer at said reduced speed.

4. The combination defined in claim 3, including a spring clip having one end adapted to be supported from the fork of said bicycle and comprising a pair of semi-circular integrally formed spring legs formed at the other end of said clip with said legs extending in opposite directions for grasping said housing therebetween, and a reverse bend at the end of each leg for engaging a respective longitudinal groove in said housing.

5. The combination defined in claim 1 in which said one gear has only two teeth and said other gear has ten teeth.

6. The combination defined in claim 5 in which said teeth have a pitch of substantially 44.

* * * * *